United States Patent [19]

Nakai

[11] Patent Number: 5,691,786
[45] Date of Patent: Nov. 25, 1997

[54] LIQUID CRYSTAL DISPLAY DEVICE HAVING COMPENSATING CAPACITIVE ELEMENT FOR DEFECTIVE PIXELS

[75] Inventor: Yutaka Nakai, Yokohama, Japan

[73] Assignee: Kabushiki Kaisha Toshiba, Kawasaki, Japan

[21] Appl. No.: 516,362

[22] Filed: Aug. 17, 1995

[30] Foreign Application Priority Data

Aug. 24, 1994 [JP] Japan .................. 6-199378

[51] Int. Cl.⁶ .......................................... G02F 1/1343
[52] U.S. Cl. ........................................................ 349/39
[58] Field of Search ........................................ 349/38, 39

[56] References Cited

U.S. PATENT DOCUMENTS

| | | | |
|---|---|---|---|
| 5,042,916 | 8/1991 | Ukai et al. | 359/59 |
| 5,132,819 | 7/1992 | Noriyama et al. | 359/58 |
| 5,151,807 | 9/1992 | Katayama et al. | 359/59 |
| 5,260,818 | 11/1993 | Wu | 359/59 |
| 5,337,173 | 8/1994 | Atsumi et al. | 359/59 |
| 5,392,143 | 2/1995 | Akiyama et al. | 359/59 |

FOREIGN PATENT DOCUMENTS 1-267520  10/1989  Japan .

*Primary Examiner*—William L. Skies
*Assistant Examiner*—James A. Dudek
*Attorney, Agent, or Firm*—Oblon, Spivak, McClelland, Maier & Neustadt, P.C.

[57] ABSTRACT

A liquid crystal display device includes storage capacitive elements and compensating storage capacitive elements, both dedicated to pixel electrodes, respectively, and both having cut regions, respectively. When the storage capacitive elements are separated from the storage capacitive lines for repair, the compensating storage capacitive elements are separated from the pixel electrodes, thereby restraining a change in a voltage applied to the pixels and minimizing a change in display characteristics due to repair.

25 Claims, 6 Drawing Sheets

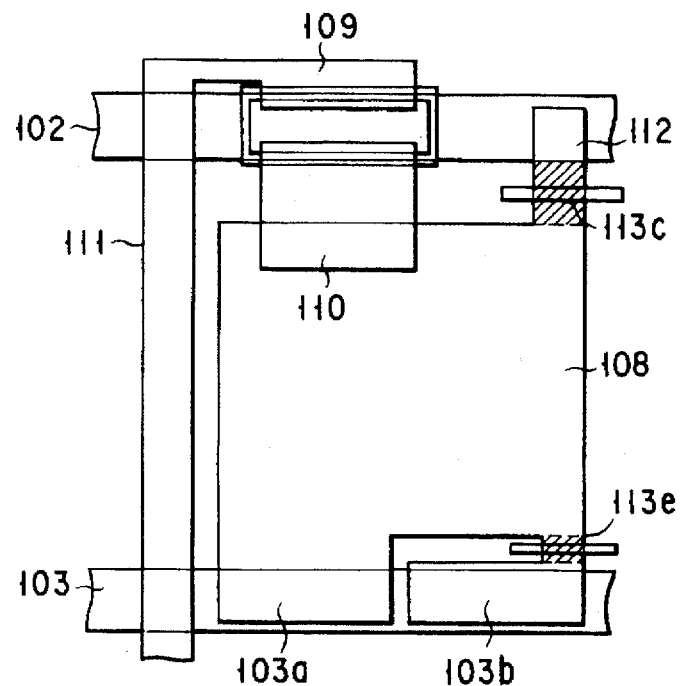
F I G. 10
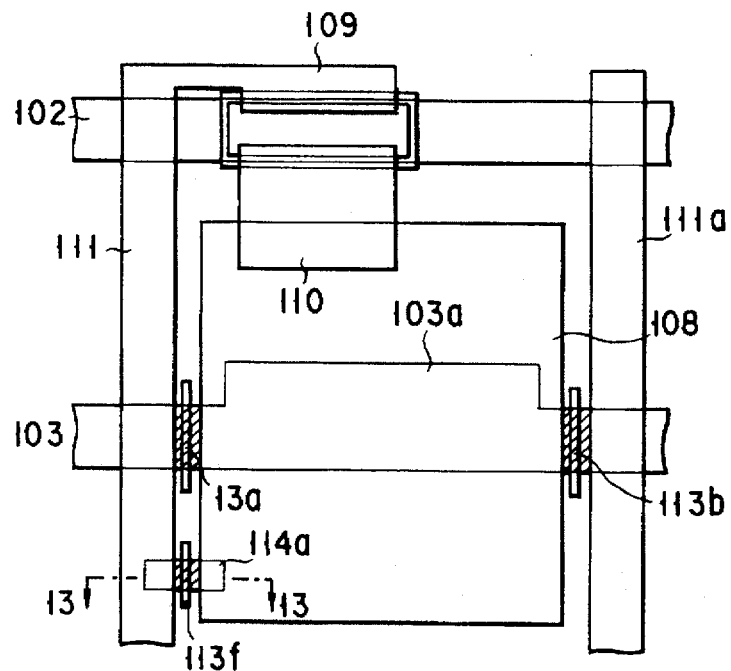
F I G. 11

LIQUID CRYSTAL DISPLAY DEVICE HAVING COMPENSATING CAPACITIVE ELEMENT FOR DEFECTIVE PIXELS

BACKGROUND OF THE INVENTION

1. Field of the Invention

This invention relates to a liquid crystal display device, and more particularly to a liquid crystal display device having a structure for repairing a storage capacitive element.

2. Description of the Related Art

In general, a liquid crystal display device is thin and light, can be driven by a low voltage, and can easily be modified so as to display color images. Therefore, liquid crystal display devices are used as the displays of personal computers and word processors. Among the liquid crystal display devices, an active matrix type liquid crystal display device (hereinafter called simply a "liquid crystal display device") using a TFT (Thin Film Transistor) as a switching element is much expected as the display of a full color TV or an Office Automation system. This is because it shows little degradation in contrast, response, etc. although it incorporates many pixels, and further it can perform half tone display. In this device, a plurality of pixels are arranged in the form of a matrix, and are driven by the TFT to display an image.

FIG. 1 is a schematic view, showing that portion of a TFT array substrate employed in the conventional liquid crystal display device, which corresponds to one pixel. In FIG. 1, reference numeral 86 denotes the pixel electrode of a liquid crystal cell connected to the TFT which serves as a switching element. More specifically, the pixel electrode 86 is connected to the source electrode 85 of the TFT.

The drain electrode 87 of the TFT is connected to a signal line 81. Although in FIG. 1, the gate electrode of the TFT is also used as a scanning line 82, there is a case where the gate electrode is lead from the scanning line 82 like the drain electrode 87.

Reference numeral 83 denotes a storage capacity line connected to a first branch storage capacitive electrode 83a and a second branch storage capacitive electrode 83b. The first and second branch storage capacitive electrodes 83a and 83b respectively constitute capacitors opposed to the pixel electrode 86 with an insulating film (not shown). These capacitors each have a function for storing voltage signals applied to liquid crystal cells.

Since more enlarged and complicated liquid crystal display devices are being developed, the number and density of pixels required in each device are increasing. As a result, the rate of occurrence of a defective pixel (a defective TFT or a defective storage capacity line) is increased, and accordingly the yield of products is significantly reduced. A method for repairing defective pixels, in particular, defective storage capacitive lines (storage capacitances) which may cause a reduction in the yield of products, will be explained below.

The above-described first branch storage capacitive electrode 83a is formed integral with the storage capacitive line 83 as one body. On the other hand, the second branch storage capacitive electrode 83b can be selectively connected to the storage capacitive line 83. In other words, the first branch storage capacitive electrode 83a is electrically connected to the capacitive line 83 from the beginning, and forms a storage capacitance together with the above-described insulating film and the pixel electrode 86. However, the second branch storage capacitive electrode 83b is made to be electrically disconnected from the capacitive line 83.

When the capacitor constituted by the first branch storage capacitive electrode 83a has been found to be defective, the storage capacitive line 83 is electrically disconnected from the first branch storage capacitive electrode 83a, and electrically connected to the second branch storage capacitive electrode 83b, thus compensating the storage capacitance. Degradation of the display characteristics due to a defective capacitive line can be prevented by repairing the storage capacitance by substituting the first branch storage capacitive electrode 83a with the second branch storage capacitive electrode 83b.

Electrical disconnection of the first branch storage capacitive electrode 83a from the storage capacitance 83 can be performed, for example, by radiating a laser beam to cross a cut region 84a and thereby separating the former from the latter.

Further, electrical connection of the second branch storage capacitive electrode 83a to the storage capacitance 83 is performed in the following manner:

FIG. 2 is a sectional view, taken along lines 2—2 of FIG. 1. As is shown in FIG. 2, a connecting electrode 88 is formed on the storage capacitive line 83 and the lead-out line 83b' of the second branch storage capacitive electrode 83b, with an insulating film 89 interposed therebetween. The connecting electrode 88 has portions 84b overlapping with the storage capacitive line 83 and the lead-out line 83b' of the second branch storage capacitive electrode 83b.

When a laser beam has been radiated onto the overlapping portions 84b as indicated by arrows 90 in FIG. 2, the storage capacitive line 83 and the lead-out line 83b' are abruptly heated as a result of absorption of the energy of the laser beam 90, thereby being liquidized or vaporized. These lines expand and extrude to the connecting electrode 88 through the insulating film 89, and are accordingly electrically connected to the electrode 88.

However, the above-described repair method using a preparatory Storage capacitive line (the second branch storage capacitive electrode 83b), i.e. the repair method using a redundant structure, significantly reduces the numerical aperture. Specifically, since that portion of the pixel electrode 86 which is located on the second branch storage capacitive electrode 83b does not contribute to display, the numerical aperture is reduced by the area of the second branch storage capacitive electrode 83b.

A repair method using the conception of pseudo repair is considered to solve the numerical aperture reduction problem. FIG. 3 is a schematic view, showing that portion of a TFT array substrate to which the pseudo repair method is applicable, which corresponds to one pixel. In FIG. 3, elements similar to those in FIG. 1 are denoted by corresponding reference numerals, and no detailed explanations will be given thereof.

The repair of the storage capacitance is performed as follows:

If the storage capacitive line 83 is defective, a laser beam is radiated to cross the cut region 84a to electrically disconnect the line 83 from the first branch storage capacitive electrode 83a.

It is considered that the display characteristics of the defective pixel differ from those of a normal pixel as a result of disconnection of the storage capacitance 83a. If, however, a change in display characteristics caused by the repair can be made smaller than the visibility limit of a man, the pixel defect becomes invisible, which means that the defect is considered to be substantially repaired. Since in this case, there is provided only one branch storage capacitive line, the numerical aperture is not reduced.

Actually, however, disconnection of the branch storage capacitive electrode 83a from the storage capacitive line 83 causes a great change in display characteristics, with the result that a defective pixel may be visible, depending upon the type of a display image.

In summary, the method using a redundant structure has the problem of significantly reducing the numerical aperture at the time of repairing a defective pixel due to a defective storage capacitance. Further, the pseudo method for preventing the reduction of the numerical aperture has the problem of showing a great difference in display characteristics between a normal pixel and a repaired pixel.

SUMMARY OF THE INVENTION

It is the object of the invention to provide a liquid crystal display device having a structure capable of preventing a reduction in numerical aperture and minimizing a change in display characteristics due to repair to a degree at which no practical problem will occur.

To attain the object, there is provided a liquid crystal display device comprises a transparent substrate; a plurality of pixel electrodes arranged in rows and columns on the transparent substrate; a plurality of thin film transistors arranged in rows and columns and dedicated to the pixel electrodes, respectively, each of the thin film transistors serving as a switching element and having a gate electrode, a source region and a drain region; a plurality of scan lines arranged in the direction of the rows and connected to the gate electrodes of the thin film transistors, respectively; a plurality of signal lines arranged in the direction of the columns and connected to the drain electrodes of the thin film transistors, respectively; a plurality of storage capacitive lines arranged in the direction of the rows; a plurality of storage capacitive elements each having a storage capacitive electrode opposed to part of a corresponding one of the pixel electrodes, and a first insulating film interposed between the storage capacitive element and the corresponding pixel electrode, the storage capacitive elements each constituting a capacitance together with the corresponding pixel electrode; a plurality of first cut regions each including a first conductor electrically disconnectably formed between a corresponding one of the storage capacitive lines arranged in the direction of the rows, and a corresponding one of the storage capacitive electrodes of the storage capacitive elements arranged in the direction of the rows; a plurality of compensating storage capacitive elements dedicated to the pixel electrodes, respectively; and a plurality of second cut regions each including a second conductor electrically disconnectably formed between a corresponding one of the pixel electrode and a corresponding one of the compensating storage capacitive elements.

Since the invention has the cut regions for electrically separating the storage capacitive elements from the storage capacitive lines, a defective pixel due to a defective storage capacitive element, if any, can be repaired without reducing the numerical aperture by separating the defective storage capacitive element.

When the storage capacitive element has been separated from the storage capacitive line, the capacitance of the liquid crystal cell varies, and accordingly the display characteristics varies. However, such a change in display characteristics can be sufficiently reduced by electrically separating the compensating storage capacitive element together with the storage capacitive element, thereby restraining a change in a voltage applied to the liquid crystal due to the separation of the storage capacitive element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 10 is a schematic plan view, showing that portion of a TFT array substrate employed in a liquid crystal display device according to a second embodiment of the invention, which corresponds to one pixel;

FIG. 11 is a schematic plan view, showing that portion of a TFT array substrate employed in a liquid crystal display device according to a third embodiment of the invention, which corresponds to one pixel;

DETAILED DESCRIPTION OF THE PREFERRED EMBODIMENTS

Figure 1:
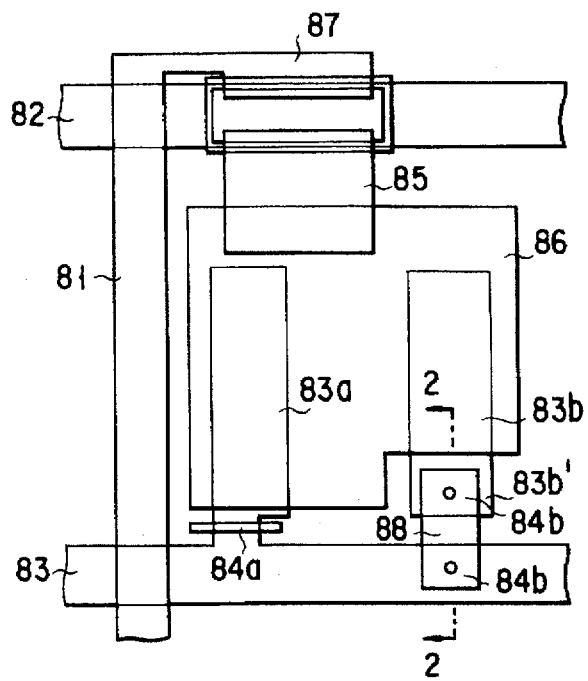
FIG. 1 is a schematic plan view, showing that portion of a TFT array substrate employed in a conventional liquid crystal display device, which corresponds to one pixel.
Figure 2:
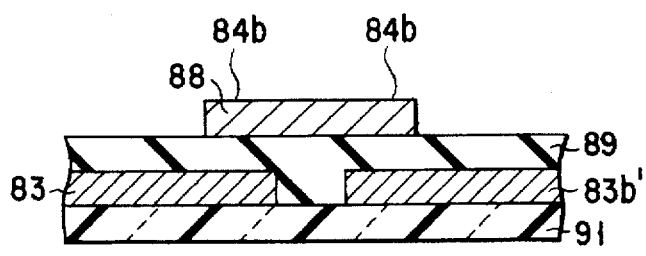
FIG. 2 is a sectional view taken along lines 2—2 of FIG. 1, useful in explaining a connecting method of a storage capacitive element.
Figure 3:
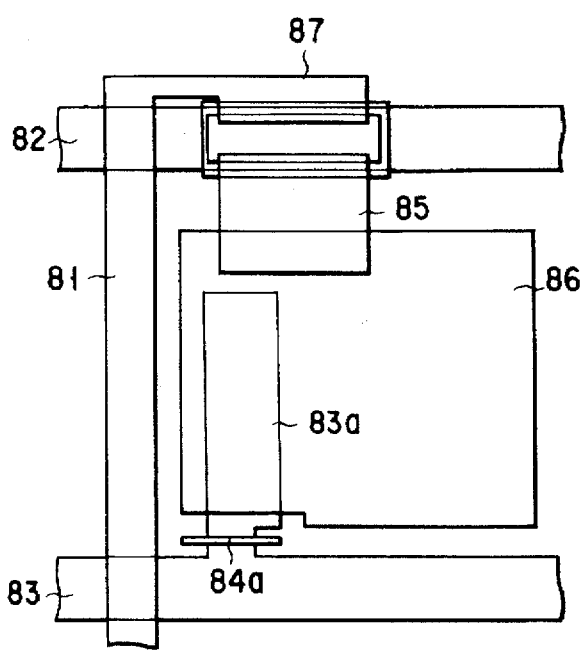
FIG. 3 is a schematic plan view, showing that portion of a TFT array substrate employed in another conventional liquid crystal display device, which corresponds to one pixel.

The embodiments of the invention will be explained with reference to the accompanying drawings. In the embodiments, like reference numeral denotes like element, and duplication of explanation will be avoided.

(First Embodiment)

Figure 4:
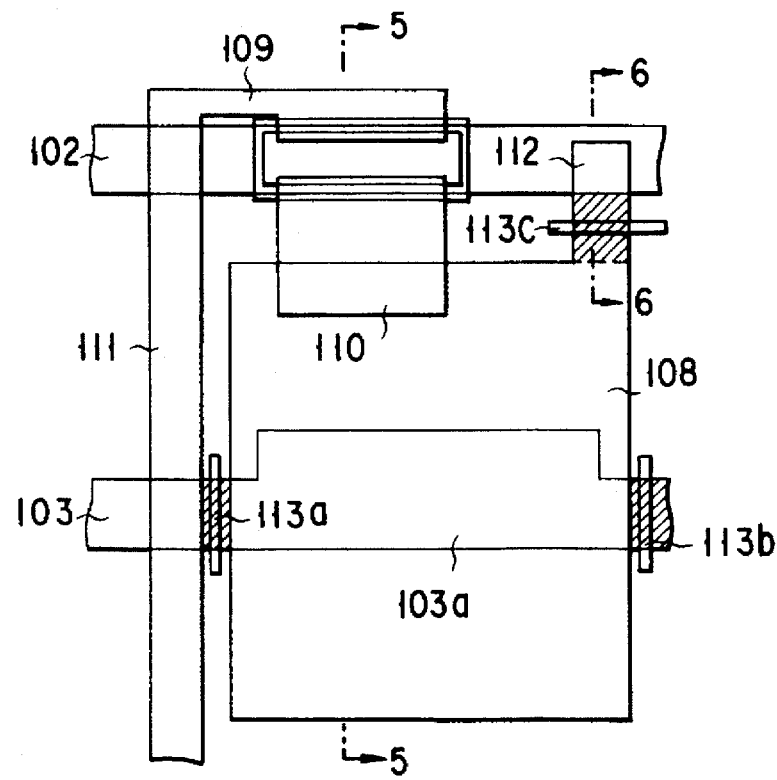
FIG. 4 is a schematic plan view, showing that portion of a TFT array substrate employed in a liquid crystal display device according to a first embodiment of the invention, which corresponds to one pixel.

FIG. 4 shows that portion of a TFT array substrate employed in a liquid crystal display device according to a first embodiment of the invention, which corresponds to one pixel. Specifically, FIG. 4 shows the mutual relationship of the overlapping patterns of devices which constitute the liquid crystal display device.

In FIG. 4, reference numeral 108 denotes a pixel electrode connected to the source electrode 110 of a TFT which serves as a switching element. The TFT further has a drain electrode 109 connected to a signal line 111, and a gate electrode 102. The gate electrode 102 also serves as a scan line.

In the overall liquid crystal display device, a plurality of pixel electrodes 108 are provided in the form of a matrix on a translucent insulated substrate. The pixel electrodes 108 have their respective TFTs arranged in the form of a matrix. The gate electrodes of those of the TFTs which are arranged in the same row are connected to the same scan line 102. The drain electrodes of those of the TFTs which are arranged in the same column are connected to the same signal line 111. FIG. 4 shows only that portion of the pixel array matrix which corresponds to one pixel.

Further, reference numeral 103 denotes a storage capacitive line which has both opposite ends supplied with power. That portion of the storage capacitive line 103 which overlaps with the pixel electrode 108 will be hereinafter called a storage capacitive electrode 103a". The storage capacitive line 103 may be formed above or below the pixel electrode 108.

Reference numerals 113a and 113b indicate cut regions, in which the storage capacitive electrode 103a is separated from the storage capacitive line 103 by radiating a laser beam. The storage capacitive line 103 is supplied with power from the opposite ends of the pixel array matrix. Since a storage capacitive defect occurs at a rate in the order of ppm, the probability of occurrence of two or more storage capacitive defects in the same column is substantially zero. Therefore, even if the both opposite ends of a defective storage capacitive electrode 103a are cut, those portions of the storage capacitive line which overlap with the pixel electrodes of pixels adjacent to the defective one are supplied with power from either of the opposite ends, and hence no problem concerning display will occur in the other pixels of the same column.

Although each cut region is indicated by a line as the trail of a laser beam, it may include a corresponding hatched portion of the storage capacitive line in FIG. 4.

A portion 112 (hereinafter called a "compensating storage capacitive electrode") of the pixel electrode 108 extends to the scan line 102, and is opposed thereto with an insulating film (not shown) interposed therebetween. Thus, the storage capacitive electrode 112, the scan line 102 and the insulating film constitute a compensating storage capacitive element. The extension of the pixel electrode 108 has a cut region 113c in which the storage capacitive electrode 112 is cut.

Although the cut region 113c is also indicated by a line as the trail of a laser beam, it may include a hatched portion of the extension of the pixel electrode in FIG. 4. Actually, the cut width of the laser beam is about 2 μm, and a portion with a width of 3 μm is necessary as a positioning margin on each of the both opposite sides of the cut width. That is, the cut region must have a width of at least 8 μm. As regards the length of the cut region, about 10 μm is preferable in light of laser workability, although there is no restrict limitation. The above-described concepts concerning the cut regions are applied to the following embodiments.

Figure 5:
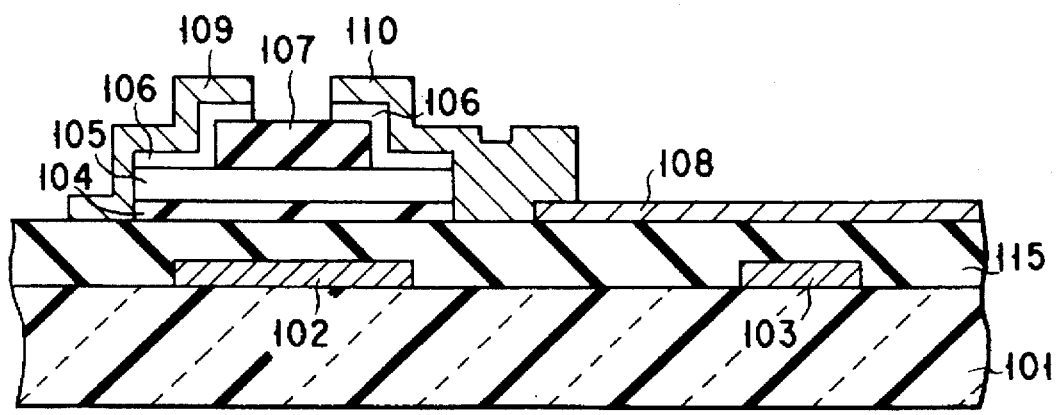
FIG. 5 is a sectional view, taken along lines 5—5 of FIG. 4.

A method for forming the above TFT array substrate will be explained with reference FIG. 5, which is taken along lines 5—5 of FIG. 4.

After a Mo—Ta alloy film with a thickness of 250 nm is formed on a cleaned glass substrate 101, the alloy film is patterned to form the gate electrode (scan line) 102 and the storage capacitive line 103.

Then, an $SiO_2$ gate insulating film 115 with a thickness of 350 nm, a silicon nitride film 104 with a thickness of 50 nm, an amorphous silicon film 105 with a thickness of 50 nm, and a silicon nitride film 107 with a thickness of 200 nm which serves as an etching stopper are formed in this order on the overall structure. The silicon nitride film 107 is patterned to a predetermined configuration.

Subsequently, an $n^+$-type amorphous silicon layer 106 with a thickness of 50 nm, which contains an impurity such as P and serves as an ohmic contact layer, is formed on the overall surface of the resultant structure. Then, the lamination film consisting of the silicon nitride film 104, the amorphous silicon film 105 and an $n^+$-type amorphous silicon layer 106 is patterned.

Figure 6:
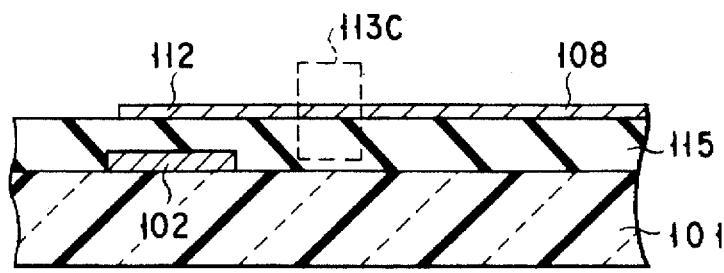
FIG. 6 is a sectional view, taken along lines 6—6 of FIG. 4.

Thereafter, an ITO film with a thickness of 100 nm is formed and patterned, thereby forming the pixel electrode 108 and the compensating storage capacitive electrode 112. FIG. 6 taken along lines 6—6 of FIG. 4 shows part of the compensating storage capacitive electrode 112.

Then, that portion of the gate insulating film 115 which is located at a terminal portion (not shown) of the gate electrode 102 is removed by etching. An Mo film with a thickness of 100 nm and an Al film with a thickness of 400 nm are laminated on the resultant structure, and patterned to form the signal line 111, the drain electrode 109 and the source electrode 110.

Finally, the $n^+$-type amorphous silicon layer 106 is removed by etching, using the drain electrode 109 and the source electrode 110 as masks, thereby electrically separating the drain electrode 109 and the source electrode 110 from each other. Thereafter, a silicon nitride film (not shown) with a thickness of 150 nm is formed as a passivation film on the resultant structure.

A repair method employed in this embodiment will now be explained. If there occurs an insulation defect between the storage capacitive line 103 and the pixel electrode 108, the corresponding pixel becomes defective. In this case, the supply of power to a storage capacitive electrode 103a which overlaps with the defective pixel is interrupted.

Specifically, laser beams are radiated to cross the cut regions 113a and 113b shown in FIG. 4, to cut the storage capacitive electrode 103a from the storage capacitive line 103. Since as described above, both the opposite ends of the storage capacitive line 103 are supplied with power, even when the storage capacitive electrode 103a has been cut, those portions of the storage capacitive line which overlap with pixel electrodes located on both the opposite sides of the cut electrode 103a are supplied with power. Therefore, no problem concerning display will occur in the other pixels.

This repair method is free from a reduction in numerical aperture which will appear in the case of the conventional repair method using a preparatory storage capacitance.

However, when in the repair method of the invention, the capacitance formed by the storage capacitive electrode 103a has been removed from the pixel 108, the display characteristics are greatly changed, and the defective pixel may become visible depending on the type of a display image.

To prevent adverse influence on the liquid crystal display device due to removal of the storage capacitive element 103a, a laser beam is radiated to cross the cut region 113c, in this embodiment, to separate from the pixel electrode 108 a compensating storage capacitive element constituted by the storage capacitive electrode 112 and the scan line 102, in order to correct the capacitance.

A detailed explanation will be given of the above-described prevention of adverse influence due to the removal of the capacitive element 103a. In a liquid crystal panel using a TFT array substrate (hereinafter simply called a "liquid crystal panel"), the pixel potential is shifted by switching noise at the time of turning off the TFT.

Figure 7:
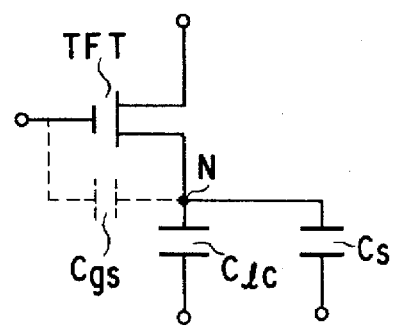
FIG. 7 is a diagram, showing a circuit equivalent to one pixel of a liquid crystal display panel, and useful in explaining pixel potential shift due to switching noise generated at the time of turning off a TFT.

FIG. 7 shows a circuit equivalent to one pixel of the liquid crystal panel. The relationship between a voltage shift dVp (pixel potential shift) at a node N, a gate voltage shift dVg at the time of turning off a TFT, a parasitic capacitance Cgs between the gate and source of the TFT, a capacitance Clc in a liquid crystal panel between the TFT array substrate and an electrode opposed thereto, and a storage capacitance Cs is expressed by $$dVp = \{Cgs/(Cgs+Clc+Cs)\}dVg \quad (1)$$

Since dVp greatly influences the display characteristics, it must be kept uniform in the liquid crystal panel. This means that a change in dVp before and after the removal of the storage capacitive element 103a must be minimized.

Figure 8:
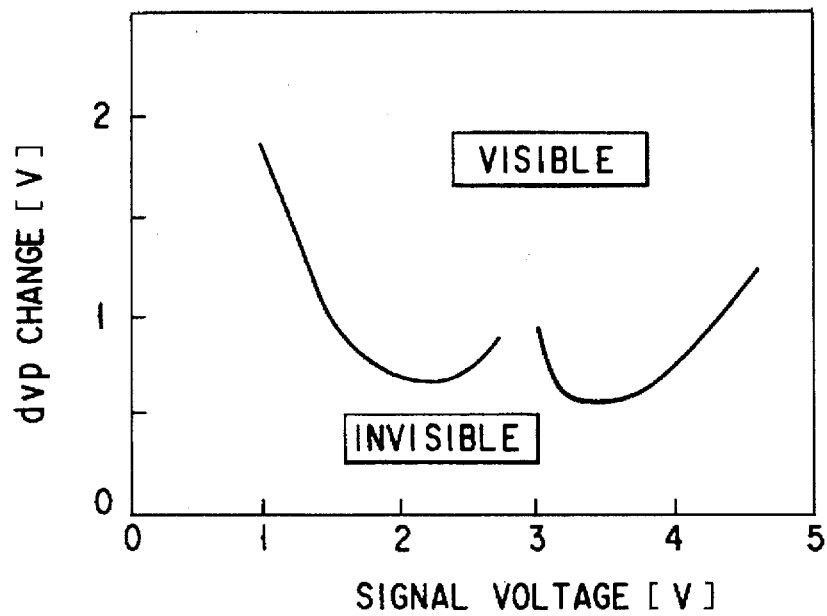
FIG. 8 is a graph, showing the relationship between a signal voltage and a change in dVp in the liquid crystal panel.

In consideration of the above, the inventor examined the relationship between dVp and the visibility of a pixel defect, and found the following (note that the liquid crystal panel used for the examination has a pixel pitch of about 300 μm and a visual range of 10–30 cm):

FIG. 8 shows the relationship between a signal voltage and a change in dVp, which was obtained by the examination. As is evident from FIG. 8, a change in display characteristics assumed when the signal voltage falls within a range of 1.5–4.0V can be most easily recognized by the eyes, and the minimum visible change in dVp is about 0.5V. When the signal voltage falls outside the range, the minimum change in dVp which is visible is 1V or more, that is, the tolerance is great. In light of this, to prevent a pixel defect from being recognized by the eyes even in the case of half-tone display, it is necessary to reduce Cgs in accordance with the removal of Cs to thereby restrain the change of dVp below a visibility limit as shown in FIG. 8.

Specific values of dVp in the cases of a normal pixel and a defective pixel will be calculated. In the calculation, the TFT parasitic Cgs was set to 0.02 pF, the liquid crystal capacitance Clc was set to 0.2 pF, the storage capacitance Cs was set to 0.2 pF, the capacitance between the scan line and the pixel electrode was set to 0.01 pF, and the gate voltage shift dVg was set to 26V.

In the normal pixel, the capacitance of 0.01 pF between the scan line and the pixel electrode (i.e. compensating storage capacitance) was added to the TFT Cgs of 0.02 pF, and a dVp of 1.8V was calculated on the basis of the above equation (1). In the defective pixel having a storage capacitance with an insulation defect, the storage capacitance was removed, and a Cs of 0 and a dVp of 3.4V were calculated. Accordingly, the difference in dVp between the normal pixel and the defective pixel was about 1.6V.

In the case of half-tone display, a change in the display characteristics of the defective pixel due to a change in dVp was visible. This fact is consistent with the results of FIG. 8. On the other hand, in the case of binary display, no great change of the display characteristics was found even where there was a great change in dVp, as compared with the half-tone display case. This means that there is a great margin for dVp, and hence design or repair of a pixel can be performed with a sufficient margin.

Moreover, when the compensating storage capacitive element was electrically disconnected from the pixel electrode of a defective pixel by radiating a laser beam, a change in the display characteristics due to the defective pixel was not visible even in the half-tone display. At this time, the capacitance of 0.01 pF between the scan line and the pixel electrode was separated, and the dVp of the defective pixel was 2.4V from the equation (1). As a result, the difference in dVp between the defective pixel and the normal pixel was only 0.6V, which means that a change in display characteristics becomes invisible even in the half-tone display.

As explained above, this embodiment can repair a defective pixel without changing its display characteristics, by interposing a compensating storage capacitive element between the scan line and the pixel electrode so as to correct a change in dVp due to the cutting of the storage capacitive line.

Although in the embodiment, the compensating storage capacitive element is constituted by the portion of the storage capacitive electrode which extends from the pixel electrode to the scan line, the element may be constituted by a portion of the storage capacitive electrode which extends from the scan line to the pixel electrode. Alternatively, the compensating storage capacitive element may be constituted by portions of the storage capacitive electrode which extend from both the pixel electrode and the scan line. In other words, it suffices if the compensating storage capacitive element is separated from a parasitic capacitance peculiar to the TFT, and has a cut region located between the pixel electrode and the scan line, in which the capacitive element can be cut from the pixel electrode.

Figure 9:
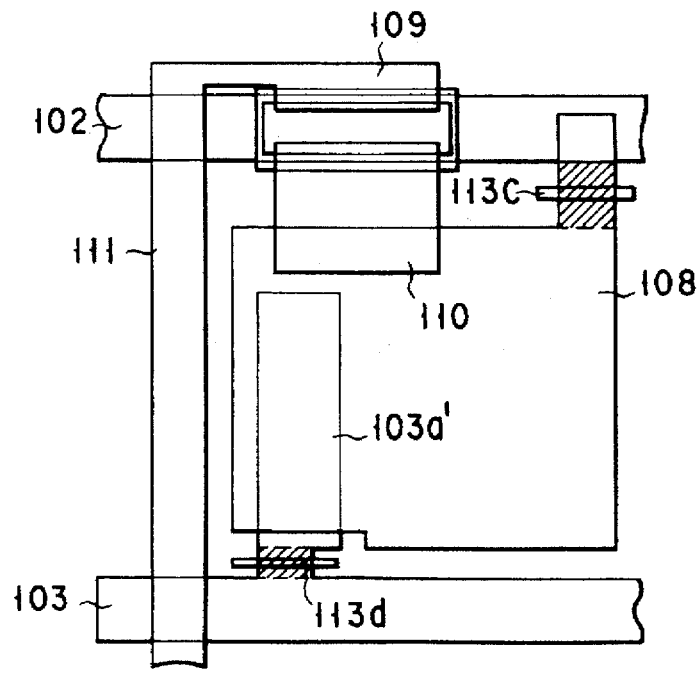
FIG. 9 is a schematic plan view, showing that portion of a TFT array substrate employed in a liquid crystal display device according to a modification of the first embodiment of the invention, which corresponds to one pixel.

Furthermore, the form of the storage capacitive element is not limited to that employed in the embodiment, but may be modified as shown in FIG. 9. In FIG. 9, a storage capacitive electrode 103a' is used, which consists of an extension of the storage capacitive line 103 and can be cut in a cut region 113d.

It is described in the embodiment that a defective pixel due to an insulation defect between a storage capacitive electrode and a pixel electrode can be repaired to a degree at which a change in display characteristics is invisible. However, to remove all the portion of the storage capacitive element which overlaps with the pixel electrode may cause a reduction in capacity-maintaining characteristics, or a change in capacitive coupling between a signal line and the pixel electrode. A TFT array substrate according to a second embodiment, which is free from this disadvantage, will be explained.

(Second Embodiment)

FIG. 10 is a view, showing that portion of a TFT array substrate employed in a liquid crystal display device according to a second embodiment, which corresponds to one pixel.

The TFT array substrate of the second embodiment differs from the first embodiment in that part of the storage capacitive element can be selectively removed.

The TFT array substrate of the second embodiment has a first storage element consisting of a pixel electrode 108 and a storage capacitive electrode 103a formed above or below the pixel electrode 108 with an insulating film (not shown) interposed therebetween, and a second storage element consisting of the pixel electrode 108 and a storage capacitive electrode 103b formed below or above the pixel electrode 108 with an insulating film (not shown) interposed therebetween. The second storage capacitive element can be cut from the pixel electrode 108 by radiating a laser beam to cross a cut region 113e of narrow width.

When in this embodiment, the storage capacitive element has been found to be defective, a laser beam is radiated to cross the cut region 113e to electrically disconnect the second storage capacitive element from the pixel electrode 108. If the second storage capacitive element is actually defective, it is determined that the storage capacitive element has successfully repaired. If, on the other hand, the first storage capacitive element is actually defective, it is determined that the repair of the storage capacitive element has failed. However, in this case, the first storage capacitive element is electrically disconnected from the pixel electrode 108, and further the compensating storage capacitive electrode 112 is disconnected from the pixel electrode 108 as in the first embodiment. As a result, the defective storage capacitive element can be repaired to a degree at which there is no visible change in display characteristics even in the case of half-tone display.

Further, the second embodiment which employs a storage capacitive element consisting of two storage capacitive element parts has the following advantage:

Since the second storage capacitive element is removed, the substantial probability of removal of a defect becomes ½. In other words, although all storage capacitive defects cannot be repaired, the number of defective elements can be reduced to the half of that in the conventional case. Although the rate of occurrence of a defect in a storage capacitive element is lower than that of a defect in other elements, to reduce the probability of occurrence of a defect to substantially ½ by means of a simple repairing work can provide a great economical advantage in light of the fact that the liquid crystal display device is generally expensive.

If all storage capacitive elements have cut portions, it is necessary to provide, in each cut portion, a space (cut region) for radiating a laser beam therethrough, with the result that the numerical aperture is inevitably reduced. To minimize a reduction in numerical aperture, the liquid crystal display device is designed such that only storage capacitive elements which are predetermined to be cut have cut portions. Moreover, since in the second embodiment, each cut portion of the storage capacitive element is smaller than that in the first embodiment, the difference in dVp between a defective pixel and a normal pixel is smaller than in the first embodiment, and the problems concerning the capacity-maintaining characteristic and concerning the capacitive coupling with signal lines can be solved.

In the case of removing the second storage capacitive element 103b, it was found, as a result of estimation of the display characteristics of a repaired pixel, that the dVp value of the repaired pixel was 2.4V, and the difference in dVp between the repaired pixel and a normal one was 0.8V. This means that there was almost no visible change in display characteristics.

Further, when the compensating storage capacitive electrode 112 was removed from the pixel electrode 108, the dVp value became 1.6V, which was almost equal to the dVp value of the normal pixel. In this case, it was also found that extremely stable display can be realized even through long use.

Although the storage capacitive element can be divided into three or more portions, the number of divided portions is preferably 2 as in the second embodiment to avoid a too complicated state. In addition, although a plurality of compensating storage capacitive elements which can be electrically disconnected may be provided between a signal line and a pixel electrode, one compensating storage capacitive element may be sufficient practically. Even where there are provided a plurality of storage capacitive elements and a plurality of compensating storage capacitive elements, it is not always necessary that they are equally divided in width.

(Third Embodiment)

FIG. 11 is a schematic plan view, showing that portion of a TFT array substrate employed in a liquid crystal display device according to a third embodiment, which corresponds to one pixel.

The third embodiment differs from the above-described embodiments in that it has a structure for preventing pixel potential shift due to capacitive coupling of a signal line and a pixel electrode, which occurs at the time of the polarity of the signal line being inverted.

Figure 12:
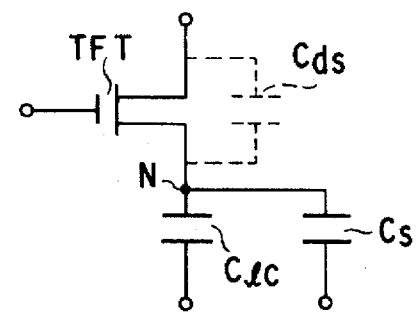
FIG. 12 is a diagram, showing a circuit equivalent to one pixel of a liquid crystal display panel, and useful in explaining pixel potential shift at the time of inverting the polarity of a signal line.

FIG. 12 is a circuit equivalent to one pixel of a liquid crystal panel, useful in explaining the pixel potential shift. In FIG. 12, The relationship between a voltage shift dVp' (pixel potential shift) at a node N, a signal line voltage shift dVs, a parasitic capacitance Cds between the signal line and a pixel electrode, a liquid crystal capacitance Clc, and a storage capacitance Cs is expressed by $$dVp'=\{Cds/(Cds+Clc+Cs)\}dVs \quad (2)$$

Since dVp' greatly influences the display characteristics, a change in dVp' in the liquid crystal panel after repair (after removing a storage capacitive element) is preferably small.

Figure 13:
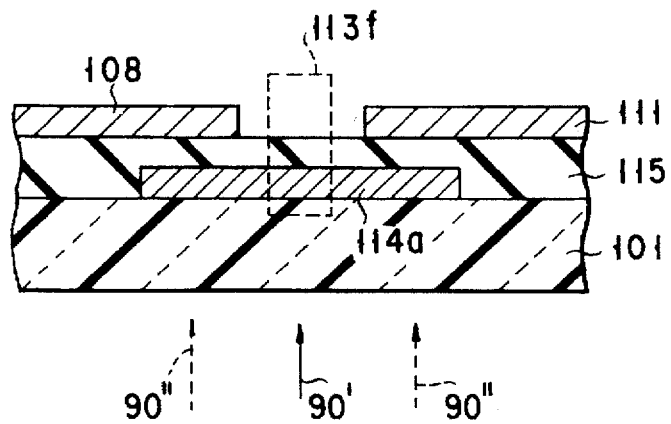
FIG. 13 is a sectional view taken along lines 13—13 of FIG. 11, useful in explaining a method for cutting a compensating storage capacitive element employed in the third embodiment.

In FIG. 11, reference sign 114a denotes a connecting electrode, whose cross section is shown in FIG. 13 (which is taken along lines 13—13 of FIG. 11). The connecting conductor 114a formed on the substrate 101 is opposed to the edges of the pixel electrode 108 and the signal line 111, with the insulating film 115 interposed therebetween, thus forming two compensating storage capacitive elements. These two capacitive elements are connected in series by means of the connecting conductor 114a.

A laser beam indicated by arrow 90' is radiated to cross a cut region 113f to cut a central portion of the connecting electrode 114a so as to electrically disconnect the signal line 111 from the pixel electrode 108. Thus, the capacitance between the pixel electrode 108 and the signal line 111 is reduced.

A repair method according to the third embodiment will now be explained.

If there is an insulation defect between the storage capacitive line 103 and the pixel electrode 108, the pixel has degraded display characteristics. Therefore, the supply of power to the storage capacitive electrode 103a which overlaps with the defective pixel is interrupted.

More specifically, laser beams are radiated to cross the cuts region 113a and 113b as shown in FIG. 11 so as to cut the storage capacitive electrode 103a from the storage capacitive line 103. Even when the storage capacitive electrode 103a has been cut from the storage capacitive line 103 at the cut regions 113a and 113b, no problem will occur. This is because the line 103 is supplied with power from both opposite sides and accordingly those portions of the line 103 which overlap with pixel electrodes located adjacent thereto are supplied with power.

This repair method prevents such a reduction in numerical aperture as occurs in the conventional repair method using a preparatory storage capacitive element.

However, it is possible in the above-described repair method that removal of the storage capacitive electrode 103a from the storage capacitive line 103 causes a great change in dVp', with the result that the defective pixel will be visible depending upon the type of a display image.

To avoid this, in the third embodiment, a laser beam indicated by arrow 90' is radiated to cross a cut region 113f as shown in FIG. 13, to cut a central portion of the connecting electrode 114a and remove the compensating storage capacitive element. As a result, the capacitance Cds is reduced, thereby reducing a change in dVp' and restraining a change in display characteristics. This will be explained in more detail.

The inventor examined the relationship between a change in dVp' and the visibility of a pixel defect. The liquid crystal panel used for estimation had pixels arranged with a pitch of about 300 μm and a visual range of 10–30 cm. Since the time required until the polarity of the signal line is inverted after turning off the TFT of a pixel is short in a lower portion of the liquid crystal panel, the lower portion is sensitive to a chance in dVp'.

Figure 14:
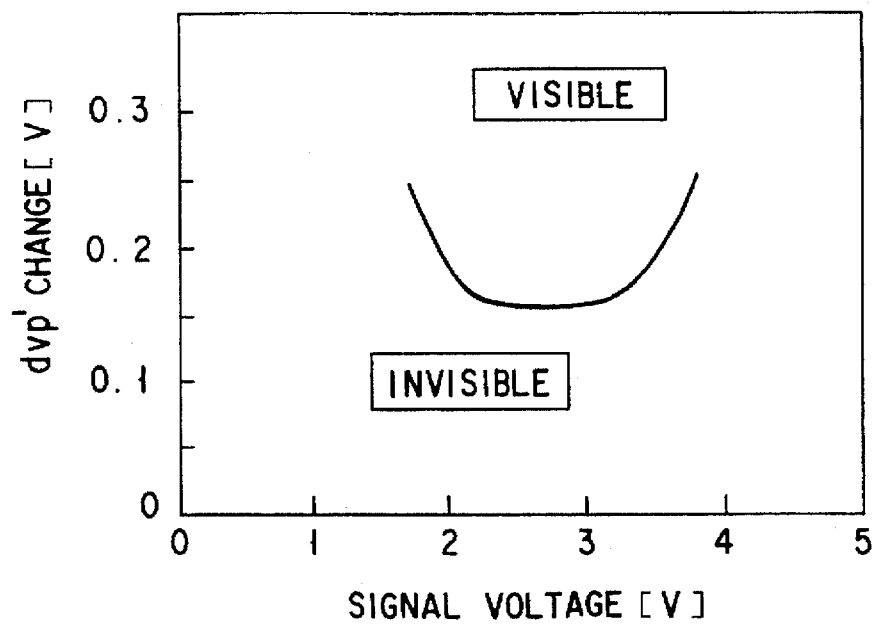
FIG. 14 is a graph, showing the relationship between a signal voltage and a change in dVp in a liquid crystal panel employed in the third embodiment.

Estimation results concerning a pixel in the lower portion of the liquid crystal panel are shown in FIG. 14, which is a graph of the relationship between a change in dVp' and the visibility of a pixel defect. As is evident from FIG. 14, a change in display characteristics is most visible when the signal voltage is 2.0–3.5V, where a minimum visible change in dVp' is about 0.15V. For the other values of the signal voltage, a minimum visible change in dVp' is high, which means that the tolerance zone is large. Accordingly, to prevent a pixel defect from being recognized by the eyes even in the half-tone display, the parasitic capacitance Cds is minimized in accordance with the removed storage capacitance Cs, thereby restraining a change in dVp' below a visibility limit as shown in FIG. 14.

Specific values of dVp' in various cases will be calculated. In the calculation, the liquid crystal capacitance C1c was set to 0.3 pF, the storage capacitance Cs was set to 0.3 pF, the parasitic Cds between the signal lines and the pixel electrode was set to 0.03 pF, the compensating storage capacitance of the connecting electrode 114a between the signal line and the pixel electrode was set to 0.02 pF, and the signal line voltage shift dVs was set to 10V.

The capacitance of the compensating storage capacitive element is added to the capacitance between the signal line and the pixel electrode. In the case of a normal pixel, the value of dVp' is 0.8V from the equation (2). When the storage capacitive element has been removed, the value of dVp' is 1.4V. Thus, the difference of dVp' between the normal pixel and a defective one is 0.6V. This difference renders a change in display characteristics visible. On the other hand, when the compensating storage capacitive element has been removed by cutting the connecting electrode 114a, the value of dvp' is 0.9V. Therefore, the difference of dVp' therebetween is only 0.1V. As a result, a change in display characteristics is invisible.

Although in the third embodiment, repair of a defective pixel due to a defective storage capacitive line is explained, a defective pixel mainly due to a defective TFT can be repaired using the connecting electrode 114a. Specifically, in the case of a defective pixel which is always bright irrespective of whether or not a signal voltage is applied to its pixel electrode, laser beams indicated by broken arrows 90'' are radiated to connect the signal line 111 to the pixel electrode 108 by means of the connecting electrode 114a, with the result that the pixel is kept dark at all times. Moreover, it is preferable to perform, with the liquid crystal display device lighted, at least one of detection of a defective pixel, cutting of a storage capacitive element, and cutting of a compensating storage capacitive element.

(Fourth Embodiment)

In order to reduce the influence of a parasitic capacitance between a signal line and a pixel electrode upon dVp', there is provided a method for inverting the potentials (i.e. the polarities) of signal lines adjacent to each other. Since in this method, the polarities of the adjacent signal lines are inverted, potential shifts offset each other, which will occur in a pixel electrode between the signal lines due to changes in their potentials. Therefore, if the difference of a parasitic capacitance between the pixel electrode and one of the signal lines and a parasitic capacitance between the pixel electrode and the other signal line is decreased, dVp' decreases.

Figure 15:
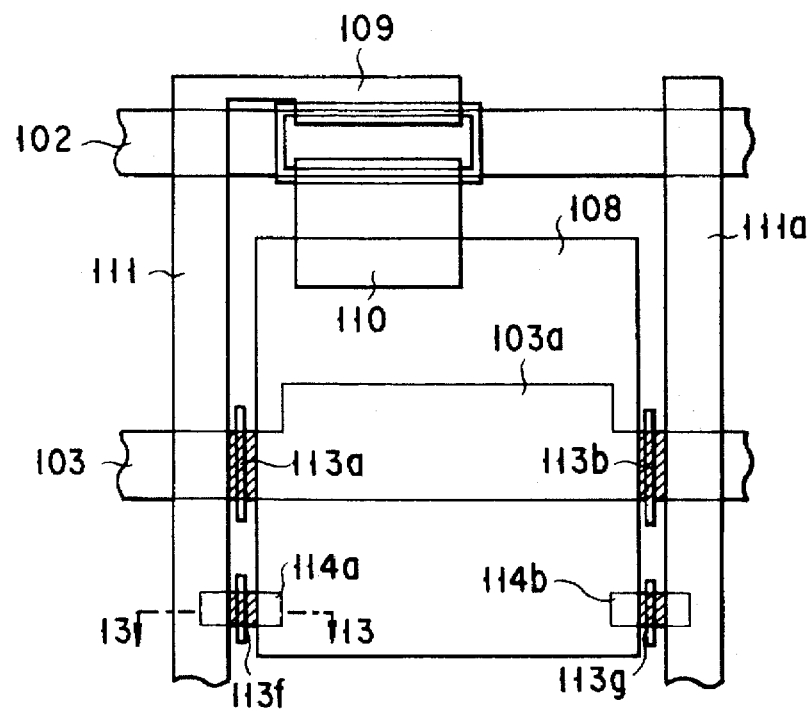
FIG. 15 is a schematic plan view, showing that portion of a TFT array substrate employed in a liquid crystal display device according to a fourth embodiment of the invention, which corresponds to one pixel.

FIG. 15 is a plan view, showing a liquid crystal display device according to a fourth embodiment and relating to the above method. The fourth embodiment differs from the third embodiment in that a second connecting electrode 114a is interposed between the pixel electrode 108 and a signal line 111a which is located adjacent to the signal line 111. The connecting electrode 114b has the same structure as the connecting electrode 114a, and has a cut region 113g at its center. This electrode 114b can reduce the difference in capacitance between the pixel electrode and each of the signal lines adjacent thereto.

The fourth embodiment will be explained in more detail, using specific values. The signal line voltage shift dVp' is expressed by $$dVp'=\{(Cds1+Cx1)dVs1+(Cds2+Cx2)dVs2\}/\{(Cds1+Cx1)+(Cds2+Cx2)+Cs+Cls\} \quad (3)$$

where Cds1 represents the parasitic capacitance between a signal line and a pixel electrode, Cds2 the parasitic capacitance between the pixel electrode and a signal line adjacent to the first-mentioned signal line, Cx1 and Cx2 the parasitic capacitances of the compensating storage capacitive elements, respectively, dVs1 and dVs2 potential shifts in the signal lines, respectively, Cs the storage capacitance, and Cls the capacitance of the liquid crystal.

When Cds1=Cds2=0.015 pF, dVs1=10V, and dVs2=−2V (which means that the polarity is inverted), a dVp' of 0.4V is calculated from the equation (3), if the pixel is normal. On the other hand, if the storage capacitance is removed (in the case where the pixel is defective), dVp' becomes 0.8V. Thus, the difference in dVp' between the normal pixel and the repaired pixel is 0.4V, which means that the repaired pixel is visible. If the compensating storage capacitive element (Cx2) is cut, dVp' becomes 0.9V. In this case, the difference in dVp' therebetween is 0.5V, which indicates that the repaired pixel is visible, too. However, if both the compensating storage capacitive elements (Cx1, Cx2) are cut, dVp' becomes 0.4V. This means that there is no difference between the normal pixel and the repaired pixel, i.e. the repaired pixel is invisible.

As described above, inverting the polarities of the potentials of adjacent signal lines from each other reduces the dVp' value of a normal pixel. Further, simultaneously removing two compensating storage capacitive elements provided between a pixel electrode and two signal lines adjacent to the pixel electrode reduces the difference in dVp' between the normal pixel and a repaired pixel.

In summary, in the invention, a defective pixel, if any, due to a defective storage capacitive line can be repaired without reducing the numerical aperture, by separating that portion of the storage capacitive line which overlaps with the pixel electrode of the defective pixel. In addition, a change in display characteristics due to the partial separation of the storage capacitive line can be minimized by simultaneously separating the compensating storage capacitive element, with the result that the difference in display characteristics between the repaired pixel and the normal pixel can be restrained below a visibility limit.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:

transparent substrate;

plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions each including a first conductor electrically disconnectably formed between a corresponding one of the storage capacitive lines arranged in the direction of the rows and a corresponding one of the storage capacitive electrodes of the storage capacitive elements arranged in the direction of the rows;

a plurality of compensating storage capacitive elements dedicated to the pixel electrodes, respectively; and a plurality of second cut regions each including a second conductor electrically disconnectably formed between a corresponding one of the pixel electrodes and a corresponding one of the compensating storage capacitive elements;

wherein each of the compensating storage capacitive elements is a capacitive element interposed between a corresponding one of the scan lines and a corresponding one of the pixel electrodes located adjacent to the corresponding one of the scan lines.

2. A liquid crystal display device comprising:

transparent substrate;

plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions each including a first conductor electrically disconnectably formed between a corresponding one of the storage capacitive lines arranged in the direction of the rows and a corresponding one of the storage capacitive electrodes of the storage capacitive elements arranged in the direction of the rows;

a plurality of compensating storage capacitive elements dedicated to the pixel electrodes, respectively; and a plurality of second cut regions each including a second conductor electrically disconnectably formed between a corresponding one of the pixel electrodes and a corresponding one of the compensating storage capacitive elements;

wherein the compensating storage capacitive elements comprise the scan lines, second insulating films formed thereon, and the second conductors included in the second cut regions and extending on the second insulating films, respectively.

3. The liquid crystal display device according to claim 2, wherein the second conductor included in a corresponding one of the second cut regions is constituted by an extension of a corresponding one of the pixel electrodes.

4. The liquid crystal display device according to claim 3, wherein the second conductor has a width smaller than that of a corresponding one of the pixel electrodes.

5. A liquid crystal display device comprising:

transparent substrate;

plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of the first cut regions each including a first conductor electrically disconnectably formed between a corresponding one of the storage capacitive lines arranged in the direction of the rows and a corresponding one of the storage capacitive electrodes of the storage capacitive elements arranged in the direction of the rows;

a plurality of compensating storage capacitive elements dedicated to the pixel electrodes respectively; and a plurality of second cut regions each including a second conductor electrically disconnectably formed between a corresponding one of the pixel electrodes and a corresponding one of the compensating storage capacitive elements;

wherein each of the compensating storage capacitive elements is a capacitive element formed between a corresponding one of the pixel electrodes and that one of the signal lines which is adjacent to the corresponding one of the pixel electrodes.

6. A liquid crystal display device comprising:

transparent substrate;

plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions each including a first conductor electrically disconnectably formed between a corresponding one of the storage capacitive lines arranged in the direction of the rows and a corresponding one of the storage capacitive electrodes of the storage capacitive elements arranged in the direction of the rows;

a plurality of compensating storage capacitive elements dedicated to the pixel electrodes, respectively; and a plurality of second cut regions each including a second conductor electrically disconnectably formed between a corresponding one of the pixel electrodes and a corresponding one of the compensating storage capacitive elements;

wherein each of the compensating storage capacitive elements comprises a corresponding one of the pixel electrodes, that one of the signal lines which is adjacent to the corresponding one of the pixel electrodes, insulating films formed on a first edge portion of the corresponding one of the pixel electrodes and on a second edge portion of said one of the signal lines, and a connecting electrode bridging between the first and the second edge portion with the insulating films respectively interposed therebetween.

7. The liquid crystal display device according to claim 6, wherein the connecting electrode has a corresponding one of the second cut regions between the corresponding one of the pixel electrodes and that one of the signal lines which is adjacent to the corresponding one of the pixel electrodes.

8. A liquid crystal display device comprising:

transparent substrate;

plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions each including a first conductor electrically disconnectably formed between a corresponding one of the storage capacitive lines arranged in the direction of the rows and a corresponding one of the storage capacitive electrodes of the storage capacitive elements arranged in the direction of the rows;

a plurality of compensating storage capacitive elements dedicated to the pixel electrodes, respectively; and a plurality of second cut regions each including a second conductor electrically disconnectedly formed between a corresponding one of the pixel electrodes and a corresponding one of the compensating storage capacitive elements;

wherein the storage capacitive electrodes of the storage capacitive elements are arranged so as to cross the pixel electrodes in the direction of the rows and have the first cut regions at both opposite ends thereof, respectively, and each of storage capacitive lines is formed so as to connect the storage capacitive electrodes in a corresponding one of the rows in series, intervening between the first cut regions directly adjacent to each other.

9. A liquid crystal display device comprising:

a transparent substrate;

a plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions each including a first conductor electrically disconnectably formed between a corresponding one of the storage capacitive lines arranged in the direction of the rows and a corresponding one of the storage capacitive electrodes of the storage capacitive elements arranged in the direction of the rows;

a plurality of compensating storage capacitive elements dedicated to the pixel electrodes, respectively; and a plurality of second cut regions each including a second conductor electrically disconnectably formed between a corresponding one of the pixel electrodes and a corresponding one of the compensating storage capacitive elements;

wherein each of the storage capacitive electrodes of the storage capacitive elements which are arranged in the same row is connected to a corresponding one of the first cut regions at one end thereof, and another end of the corresponding one of the first cut regions is connected to a corresponding one of the storage capacitive lines.

10. A liquid crystal display device comprising:

a transparent substrate;

a plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions including first conductors electrically disconnectably formed between the storage capacitive lines arranged in the direction of the rows and the storage capacitive electrodes of the storage capacitive elements arranged in the direction of the rows, respectively;

a plurality of compensating storage capacitive elements dedicated to the pixel electrodes, respectively, the compensating storage capacitive elements comprising the scan lines and compensating storage capacitive electrodes, which are formed on the scan lines with the second insulating films interposed therebetween, respectively; and a plurality of second cut regions each including second conductors electrically disconnectably formed between of the pixel electrodes and the compensating storage capacitive elements which are dedicated to the corresponding pixel electrodes, respectively.

11. The liquid crystal display device according to claim 10, wherein the compensating storage capacitive electrodes and the second conductors are formed of the same material as the pixel electrodes.

12. The liquid crystal display device according to claim 10, wherein the second conductors each has a width smaller than that of the corresponding one of the pixel electrodes.

13. A liquid crystal display device comprising:

a transparent substrate;

a plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in the direction of the rows and connected to the gate electrodes of the thin film transistors, respectively;

a plurality of signal lines arranged in the direction of the columns and connected to the drain electrodes of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions including first conductors electrically disconnectably formed between the storage capacitive lines arranged in the direction of the rows and the storage capacitive electrodes of the storage capacitive elements arranged in the direction of the rows, respectively;

a plurality of compensating storage capacitive elements dedicated to the pixel electrodes, respectively, the compensating storage capacitive elements being capacitive elements formed between the pixel electrodes and the scan lines which are adjacent to the pixel electrodes, respectively; and a plurality of second cut regions including second conductors electrically disconnectably formed between the pixel electrodes and the compensating storage capacitive elements, respectively.

14. The liquid crystal display device according to claim 13, wherein the compensating storage capacitive elements comprise the pixel electrodes, the signal lines which are adjacent to the pixel electrodes, and connecting electrodes which cover both edges of the pixel electrodes and the signal lines with insulating films interposed therebetween, respectively.

15. The liquid crystal display device according to claim 14, wherein the connecting electrodes have the second cut regions between the pixel electrodes and the signal lines which are adjacent to the pixel electrodes, respectively.

16. The liquid crystal display device according to claim 13, wherein the compensating storage capacitive elements comprise the pixel electrodes, the signal lines correspondingly adjacent to the pixel electrodes, and connecting electrodes covering the corresponding pixel electrodes and the signal lines with insulating films interposed therebetween, respectively.

17. A liquid crystal display device comprising:

a transparent substrate;

a plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain electrodes of the thin film transistors, respectively; and a plurality of storage capacitive lines arranged in the direction of the rows;

wherein each of the pixel electrodes has a first and a second sub electrode, the first and the second sub electrode being formed by dividing, into two portions, part of that one side portion of each of the pixel electrodes which is parallel to a corresponding one of the scan lines; and a corresponding one of the storage capacitive lines is formed on the first and the second sub electrode in an insulated manner, thereby forming a first and a second storage capacitive element;

said liquid crystal device further comprising:

a plurality of first cut regions each including a first conductor electrically disconnectably formed between the second storage capacitive element and a corresponding one of the pixel electrodes, to separate the second storage capacitive element from the corresponding one of the pixel electrodes;

a plurality of compensating storage capacitive elements dedicated to the pixel electrodes, respectively; and a plurality of second cut regions including second conductors electrically disconnectably formed between the pixel electrodes and the compensating storage capacitive elements, respectively.

18. A liquid crystal display device according to claim 17, wherein the first cut regions each has a width smaller than that of the second sub electrode.

19. A liquid crystal display device comprising:

transparent substrate;

plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions each including a first conductor electrically disconnectably formed between a corresponding one of the storage capacitive lines arranged in the direction of the rows and a corresponding one of the storage capacitive electrodes of the storage capacitive elements arranged in the direction of the rows;

a plurality of compensating storage capacitive elements dedicated to the pixel electrodes, respectively; and a plurality of second cut regions each including a second conductor electrically disconnectably formed between a corresponding one of the pixel electrodes and a corresponding one of the compensating storage capacitive elements;

wherein each of the compensating storage capacitive elements is a capacitive element interposed between a corresponding one of the scan lines and a corresponding one of the pixel electrodes located adjacent to the corresponding one of the scan lines; and wherein the compensating storage capacitive elements comprise the scan lines, second insulating films formed thereon, and the second conductors included in the second cut regions and extending on the second insulating films, respectively.

20. The liquid crystal display device according to claim 19, wherein the second conductor included in a corresponding one of the second cut regions is constituted by an extension of a corresponding one of the pixel electrodes.

21. The liquid crystal display device according to claim 20, wherein the second conductor has a width smaller than that of a corresponding one of the pixel electrodes.

22. A liquid crystal display device comprising:

transparent substrate;

plurality of pixel electrodes arranged in rows and columns on the transparent substrate;

a plurality of thin film transistors arranged in the rows and the columns and dedicated to the pixel electrodes, respectively, the thin film transistors serving as switching elements and having gate electrodes, source regions and drain regions, respectively;

a plurality of scan lines arranged in a direction of the rows and connected to the gate electrodes of the thin film transistors, respectively;

a plurality of signal lines arranged in a direction of the columns and connected to the drain regions of the thin film transistors, respectively;

a plurality of storage capacitive lines arranged in the direction of the rows;

a plurality of storage capacitive elements having storage capacitive electrodes opposed to parts of the pixel electrodes, respectively, and first insulating films interposed between the storage capacitive electrodes and the pixel electrodes, respectively, the storage capacitive electrodes constituting capacitances together with the pixel electrodes, respectively;

a plurality of first cut regions each including a first conductor electrically disconnectably formed between a corresponding one of the storage capacitive lines arranged in the direction of the rows and a corresponding one of the storage capacitive electrodes of the storage capacitive elements arranged in the direction of the rows;

a plurality of compensating storage capacitive elements dedicated to the pixel electrodes, respectively; and a plurality of second cut regions each including a second conductor electrically disconnectably formed between a corresponding one of the pixel electrodes and a corresponding one of the compensating storage capacitive elements;

wherein each of the compensating storage capacitive elements is a capacitive element formed between a corresponding one of the pixel electrodes and that one of the signal lines which is adjacent to the corresponding one of the pixel electrodes;

wherein each of the compensating storage capacitive elements comprises a corresponding one of the pixel electrodes, that one of the signal lines which is adjacent to the corresponding one of the pixel electrodes, insulating films formed on a first edge portion of the corresponding one of the pixel electrodes and on a second edge portion of said one of the signal lines, and a connecting electrode bridging between the first and the second edge portion with the insulating films respectively interposed therebetween.

23. The liquid crystal display device according to claim 22, wherein the connecting electrode has a corresponding one of the second cut regions between the corresponding one of the pixel electrodes and that one of the signal lines which is adjacent to the corresponding one of the pixel electrodes.

24. The liquid crystal display device according to claim 22, wherein the storage capacitive electrodes of the storage capacitive elements are arranged so as to cross the pixel electrodes in the direction of the rows and have the first cut regions at both opposite ends thereof, respectively, and each of storage capacitive lines is formed so as to connect the storage capacitive electrodes in a corresponding one of the rows in series, intervening between the first cut regions directly adjacent to each other.

25. The liquid crystal display device according to claim 22, wherein each of the storage capacitive electrodes of the storage capacitive elements which are arranged in the same row is connected to a corresponding one of the first cut regions at one end thereof, and another end of the corresponding one of the first cut regions is connected to a corresponding one of the storage capacitive lines.

* * * * *

UNITED STATES PATENT AND TRADEMARK OFFICE
CERTIFICATE OF CORRECTION

PATENT NO.   : 5,691,786
DATED        : November 25, 1997
INVENTOR(S)  : Yutaka NAKAI It is certified that error appears in the above-identified patent and that said Letters Patent is hereby corrected as shown below:

On the title page, Item [54], the Title should read:

-- LIQUID CRYSTAL DISPLAY DEVICE HAVING COMPENSATING CAPACITIVE ELEMENTS FOR DEFECTIVE PIXELS --

Signed and Sealed this

Third Day of February, 1998

Attest:

BRUCE LEHMAN

Attesting Officer     Commissioner of Patents and Trademarks